US00RE34346E

United States Patent [19]

Foster, Jr. et al.

[11] E Patent Number: Re. 34,346

[45] Reissued Date of Patent: Aug. 17, 1993

[54] IONIZER

[75] Inventors: Robert W. Foster, Jr., Hinsdale; Ronald O. Hilger, Elmhurst, both of Ill.

[73] Assignee: Pollenex Corporation, Chicago, Ill.

[21] Appl. No.: 359,834

[22] Filed: May 31, 1989

Related U.S. Patent Documents

Reissue of:

[64] Patent No.: 4,811,159
Issued: Mar. 7, 1989
Appl. No.: 162,818
Filed: Mar. 1, 1988

[51] Int. Cl.[5] ..... B02C 3/66; B02C 3/82

[52] U.S. Cl. ..... 361/231; 96/82

[58] Field of Search ..... 361/213, 229, 230, 231, 361/235; 55/2, 101, 103, 130, 131, 132, 138, 139, 157; 250/423 R; 15/1.5 R, 1.5 A; 323/903

[56] References Cited

U.S. PATENT DOCUMENTS

| | | | |
|---|---|---|---|
| 2,264,495 | 12/1941 | Wilner | 361/231 |
| 2,589,463 | 3/1952 | Warburton | 55/131 X |
| 2,974,747 | 3/1961 | Coolridge, Jr. et al. | 55/130 X |
| 3,108,865 | 10/1963 | Berly | 55/131 |
| 3,936,698 | 2/1976 | Meyer | 361/231 |
| 4,083,073 | 4/1978 | Bernardini | 15/1.5 A |
| 4,232,355 | 11/1980 | Finger et al. | 361/235 |
| 4,253,852 | 3/1981 | Adams | 55/126 |
| 4,255,776 | 3/1981 | Cantelli | 361/213 |
| 4,569,684 | 2/1986 | Ibbott | 55/138 |
| 4,652,988 | 3/1987 | McLain, Sr. et al. | 363/146 |
| 4,689,715 | 8/1987 | Halleck | 361/213 |
| 4,698,074 | 10/1987 | Cumming et al. | 55/126 |

*Primary Examiner*—A. D. Pellinen
*Assistant Examiner*—David Osborn
*Attorney, Agent, or Firm*—Laff, Whitesel, Conte & Saret

[57] ABSTRACT

A small personal appliance is wholly contained within a unitary housing that is fully supported by its contact blades being plugged into a wall outlet. The housing includes needles for ionizing the ambient atmosphere and a carbon foam pad for collecting the ionized air. A drive circuit generate cyclically recurring pulses having a voltage which is high enough to ionize the air and low enough to preclude a formation of ozone.

9 Claims, 1 Drawing Sheet

IONIZER

Matter enclosed in heavy brackets [ ] appears in the original patent but forms no part of this reissue specification; matter printed in italics indicates the additions made by reissue.

This invention relates to ionizers and more particularly to ionizers which are small, easy to install, and easy to clean.

*BACKGROUND OF THE INVENTION*

An ionizer is a device which emits electrically charged ions that clean impurities from the air, and also give a sense of well being to the user. In general, the ionizer should accomplish its intended purposes without creating ozone, which is harmful to life. This means that the voltage which produces the ions is high enough to ionize the ambient air, but is not high enough to create an arc or spark.

Most the ionizers are bulky devices which occupy considerable space and which may require skilled craftsmen to install. The ionizer usually has a sharp point at the end of a wire or a needle to emit electrons under the electrical stress produced by high voltage pulses which are applied thereto. The emitted electrons ionize the air. An adjacent collector is charged oppositely to the ions in order to attract the ionized air. In the process of flowing to the collector, the ions pick up particles which are contaminates suspended in the air. Therefore, the collector becomes dirty and must be cleaned or replaced at frequent intervals. The net result of the ionizer is a cleaner, more healthful air, and a sense of well being for the user.

*BRIEF DESCRIPTION OF THE INVENTION*

Accordingly, an object of the invention is to provide new and improved ionizers which may be installed and left in a very small and compact space. Here, an object is to provide ionizers which may be quickly and easily installed at almost any location, by anyone, with no special knowledge, skill or training required to complete the installation.

Another object of the invention is to provide an ionizer which may be cleaned with almost no effort. Here, an object is to provide an ionizer which has a collector pad that may be removed and cleaned or replaced with only a slight and minimum effort.

Still another object of the invention is to provide a very low cost ionizer which may fall into a throw away class products that is used and abandoned when it needs repair.

Yet another object of the invention is to provide an ionizer with a substantially attractive exterior so that it may be used at exposed locations in an environment with a high quality decor and without attracting an undue amount of attention.

In keeping with an aspect of the invention, these and other objects are accomplished by providing a relatively small and lightweight housing that may be installed and supported simply by pressing conventional blades of a powerline plug into any convenient wall outlet. The upper part of the housing includes an oscillator for producing electronic pulses that drive six needles which produce the electrons that ionize the air. A pocket is formed in the bottom of the housing to receive an electrically conductive carbon sponge which is biased to attract the ions. Preferably the needles have a negative potential and the sponge has a positive potential. The sponge simply slides into and out of the pocket for easy cleaning or replacing.

A preferred embodiment of the invention is shown in the attached drawings, in which.

*DETAILED DESCRIPTION OF THE INVENTION*

Figure 2:
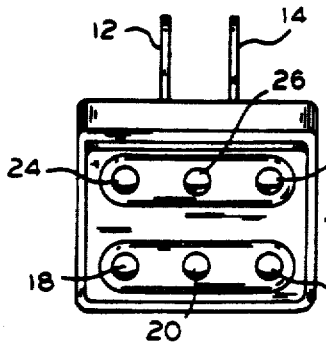
FIG. 2 is a top plan view of the inventive device.
Figure 1:
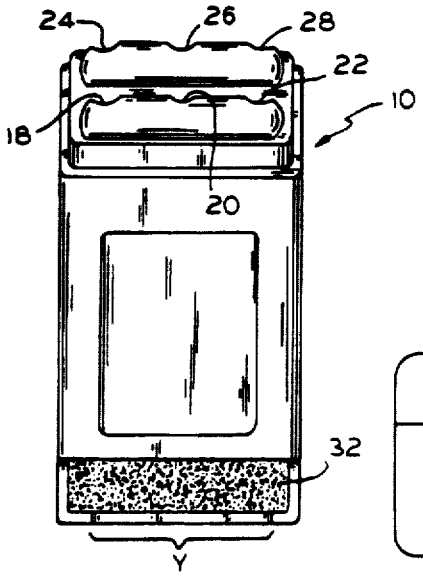
FIG. 1 is a front elevation of the inventive ionization device.
Figure 3:
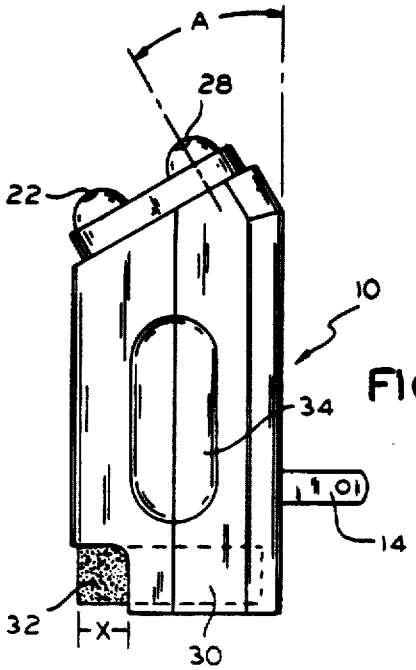
FIG. 3 is a side elevation of the inventive device.
Figure 5:
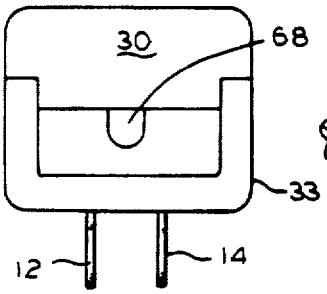
FIG. 5 is a bottom view (similar to claim 4) with the collector pad removed.
Figure 4:
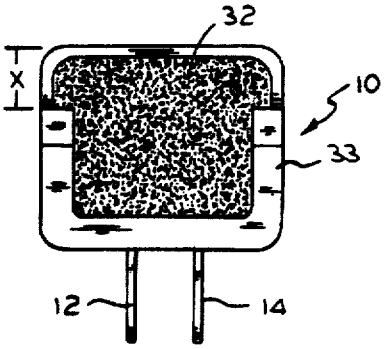
FIG. 4 is a bottom plan view of the inventive device with the collector pad in place.

FIGS. 1-5 show various views of the inventive ionizer which has a housing 10, with the contact blades 12, 14 of a conventional power plug projecting from the back and, on the top, openings 18-28 for six ionization needles. A pocket 30 is formed in the bottom of the housing to receive an electrically conductive collector pad or sponge 32; preferably, it is a cellular carbon sponge. The shape of the pocket 30 may be understood by comparing its appearances in FIGS. 3-5. The pocket exposes a substantial amount of sponge surface area to an ion collection. In greater detail, on each of two sides, a portion of the sponge 32 is exposed, as shown at "x". The entire front of the sponge is exposed, as shown at "y" FIGS. 4 and 5 show how a partial frame holds the sponge to expose most of its surface. Finger wells 34 are formed on opposite sides of the housing to facilitate a manipulation, thereof.

It should be noted that the ionizer housing is small and has been given a fairly pleasing, but not an attention getting, external appearance. Also, the housing is very small and is used at wall outlets which are often positioned to be behind a curtain or partially concealed by a piece of furniture. Therefore, the inventive ionizer may be used in the best of fine decors without attracting an undue amount of attention.

It should now be apparent that the inventive ionizer may be installed simply by pressing the power contact blades 12, 14 into a conventional 120 V. wall outlet. The electronic circuit within the housing drives the needles to emit negatively charged ions that the holes 18-28. The positively charged collector pad 32 attracts these ions which must pass through the ambient air as they travel from the holes 18-28 to pocket 30. There is a phenomenon wherein the ions behave somewhat as a "wind", whereby a draft of ions is blown out of the holes to circulate through the atmosphere before returning to the pad. Therefore, after the ionizer has operated for some period of time, the ions should be diffused over a fairly wide area.

Figure 6:
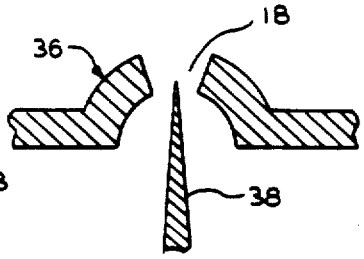
FIG. 6 is a cross section of a part of the device showing an ion needle and an ion exit opening.

FIG. 6 shows a cross section of a fragment of a housing to reveal the ion needle location. Primarily for aesthetics purposes, the housing has a raised somewhat domed shaped area 36 partially surrounding the tip of a sharp needle 38 which projects far enough into the hole 18 to insure a free flow of ions into the ambient atmosphere. Yet, the needle is buried deeply enough under the exterior surface of dome 36 to protect people who may touch the housing so that they will not be scratched by the tip or shocked by the high negative potential on the needles.

Figure 7:
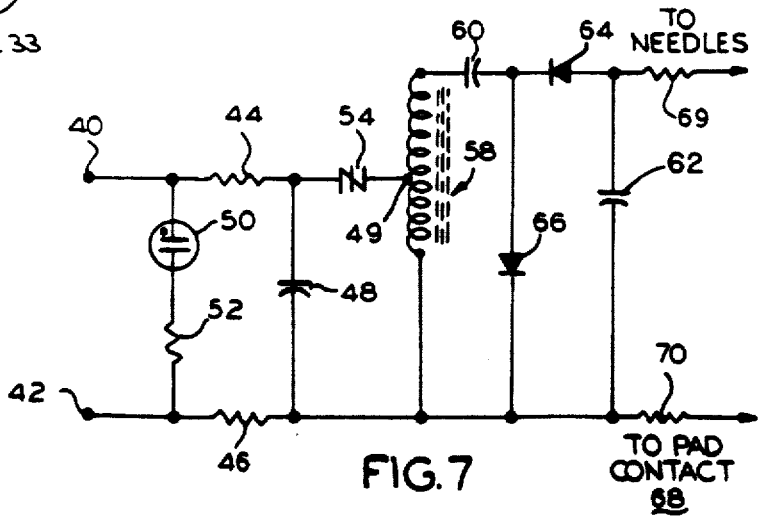
FIG. 7 is an electrical circuit of a relaxation oscillator which is used to generate pulses with a square or spike wave form that drives the inventive ionizer.

The electronic drive circuit shown in FIG. 7 is a relaxation oscillator. The terminals 40, 42 are connected through the contact blades 12, 14 (FIGS. 2–5) to a conventional wall outlet of a commercial power system. Two coupling resistors 44, 46 limit current and prevent a short circuit across the line. The capacitor 48 charges until the resulting voltage built upon its reaches a potential for firing SIDAC 54, which is somewhat similar to back two back-to-back zener diodes that break down at a certain voltage. When the SIDAC 54 fires, it discharges the capacitor 48. Thereafter, capacitor 48 recharges over a period of time. The result is that a train of square or spike wave pulse forms are applied at 49 to the primary of an autotransformer.

Gas tube 50 is an indicator which lights to show that the ionizer is "on". Resistor 52 limits current to a level which fires and sustains the gas tube 50.

The autotransformer 58 greatly increase the voltage of the square or spike wave voltage which is applied to its primary side. The two capacitors 60, 62 and two diodes 64, 66 are coupled into a network which doubles the voltage at the secondary side of the autotransformer 58. The diodes are polled to apply a negative voltage through terminal 67 to the needles 38 and a positive voltage through terminal 69 to the pad 32. Resistors 69, 70 provide a coupling and limit current to the needles 38 and the collector pad 32.

The operation should now be clear. Initially, SIDAC 54 is off, and no current reaches the autotransformer. The voltage built upon capacitor 48 reaches a level which causes an avalance within SIDAC 54 to switch it on and discharge the capacitor 48. This impresses a square or spike wave oscillating wave form on the primary of autotransformer 58. The output of the transformer 58 is a high voltage that is doubled at network 60–66. The resulting voltage at terminals 67, 68 is high enough to emit electrons from the needles 38, FIG. 6, but is not high enough to create ozone.

The electrons escaping through holes 18–28 negatively ionize the air. Those ions are attracted to the continuously positive collector pad 32. As the ions move through the air they attract contaminates which are then deposited on the collector pad 32. When the pad 32 is dirty, it is pulled out of pocket 30, and washed or replaced.

Those skilled in the art will readily perceive how modifications may be made within the scope and spirit of the invention. Therfore, the appended claims should be construed to cover all equivalent structures.

The invention claimed is:

1. An ionizer comprising a small and light weight housing with a pair of conventional electrical power plug contact blades extending therefrom, whereby the housing may be mounted by pressing the blades into a wall outlet, a pocket formed in the housing for receiving an electrically conductive collector pad while exposing a substantial surface of said collector pad to the ambient air, at least one opening formed in the housing at a location which is remote from said collector pad, at least one ion needle located at the opening and positioned to direct a stream of ions out of said opening, drive means for cyclically applying drive pulses to said needle to energize them with a negative potential which is high enough to create negative ions, but which is not high enough to create ozone, and mean for applying a positive voltage to said collector pad.

2. The ionizer of claim 1, wherein there are a plurality of said openings and needles, said housing and said needles having a physical relationship that causes substantially all ions to pass out of said openings and into the ambient air while preventing the needles from touching a person who may encounter the housing.

3. The ionizer of claim 1 wherein there are a plurality of said needles which are physically positioned to drive substantially all of said ions through said openings and out into the ambient air in a direction which is away from the collector pad, whereby said ions are dispersed throughout said ambient air before they are eventually collected by the pad.

4. The ionizer of claim 1 wherein said collector pad is a cellular carbon impregnated foam pad.

5. The ionizer of claim 1 wherever said drive means is an oscillator for generating a train of cyclically recurring square or spike wave form pulses.

6. An ionizer comprising a generally elongated housing having a pocket formed therein and at one end thereof with holes formed in said housing at a point that is remote from said pocket, said pocket having an opening extending along a part of each of two opposing sides and a front thereof for receiving a collector pad, and a frame for supporting the edges of the bottom of said collector pad, whereby substantially the entire bottom of said collector pad and at least part of each of three sides of said pad are exposed to ambient air, and means for generating a stream of negative ions emanating from said holes, said collector pad being biased by a positive potential.

7. A small personal appliance which is totally self contained within a housing *having a pair of contact blades mounted thereon* that may be plug-in mounted on a wall outlet, [needles] *needle* means in said housing for driving *only negative charged* ionized air out of said housing and into the ambient air, collector means at an opening in said housing for [collection] *collecting said negatively charged* ions from said ambient air, and drive means for cyclically applying a negative potential to said [needles] *needle means* and a positive potential to said collector means, the voltage difference between said positive and negative potentials being high enough to ionize the air and low enough not to form ozone.

8. The appliance of claim 7 wherein said housing contains a pocket for receiving and supporting said collector means, said collector means being a conductive sponge pad whereby said pad may be removed for cleaning simply by pulling it out of said pocket.

9. The appliance of claim 8 wherein said sponge pad is a carbon foam sponge pad.

* * * * *